(12) United States Patent
Mayer et al.

(10) Patent No.: US 9,443,165 B2
(45) Date of Patent: Sep. 13, 2016

(54) BLOB-ENCODING

(71) Applicant: GIESECKE & DEVRIENT GMBH, Munich (DE)

(72) Inventors: Konrad Mayer, Vienna (AT); Daniel Soukup, Vienna (AT)

(73) Assignee: GIESECKE & DEVRIENT GMBH, Munich (DE)

( * ) Notice: Subject to any disclaimer, the term of this patent is extended or adjusted under 35 U.S.C. 154(b) by 65 days.

(21) Appl. No.: 14/406,252

(22) PCT Filed: Jun. 6, 2013

(86) PCT No.: PCT/EP2013/001668
§ 371 (c)(1),
(2) Date: Dec. 8, 2014

(87) PCT Pub. No.: WO2013/182313
PCT Pub. Date: Dec. 12, 2013

(65) Prior Publication Data
US 2015/0117769 A1  Apr. 30, 2015

(30) Foreign Application Priority Data

Jun. 8, 2012  (AT) .................................. A 661/2012

(51) Int. Cl.
*G06K 9/00* (2006.01)
*G06K 9/46* (2006.01)
*G06T 7/00* (2006.01)

(52) U.S. Cl.
CPC ............ *G06K 9/4638* (2013.01); *G06K 9/4652* (2013.01); *G06T 7/0081* (2013.01); *G06T 2207/30144* (2013.01)

(58) Field of Classification Search
CPC ............ G06K 9/0006; G06K 9/00127; G06K 9/0013; G06K 9/46; G06K 9/4604; G06K 9/4614; G06K 9/4638; G06K 9/48; G06K 9/481; G06K 9/482; G06K 9/50; G06T 7/00; G06T 7/604; G06T 7/0083; G06T 7/0085; G06T 2207/20144; H04N 1/3872; H04N 1/4092; H04N 1/58
See application file for complete search history.

(56) References Cited

U.S. PATENT DOCUMENTS 4,791,676 A * 12/1988 Flickner .................... G06T 7/00
                                                          382/204
5,199,083 A  3/1993 Takeda

FOREIGN PATENT DOCUMENTS

EP  0216158 A2  4/1987
EP  1783688 A1  5/2007

OTHER PUBLICATIONS

Chang, Fu et al., "A Component-Labeling Algorithm Using Contour Tracing Technique", IEEE, Proceedings of the Seventh International Conference on Document Analysis and Recognition, Aug. 2003, p. 741-745.

(Continued)

*Primary Examiner* — Jose Couso
(74) *Attorney, Agent, or Firm* — Workman Nydegger (57) ABSTRACT

A method is directed to identifying spatially extensive image features that are not pixelwise contiguous in a two-dimensional digital image to be examined having pixels arranged in grid form in the form of a rectangular grid. Each pixel of the two-dimensional digital image is respectively assigned two coordinate values corresponding to their position in the rectangular grid of the digital image, and the respective coordinate values of adjoining pixels respectively differ by one pixel dimension. The individual pixels are run through in the order of a regular scan.

10 Claims, 3 Drawing Sheets (56) References Cited

OTHER PUBLICATIONS

Chen, Kuang-Hsiung et al., "Vision-based obstacle detection and avoidance for autonomous land vehicle navigation in outdoor roads", Automation in Construction, vol. 10, 2000, Elsevier, p. 1-25.
Di Stefano, Luigi et al., "A Simple and Efficient Connected Components Labeling Algorithm", IEEE, International Conference on Image Analysis and Processing, Sep. 1999, p. 322-327.

He, Lifeng et al., "Fast connected-component labeling", Pattern Recognition, vol. 42, 2009, Elsevier, p. 1977-1987.
Rosenfeld, Azriel et al., "Sequential Operations in Digital Picture Processing", Journal of the Association for Computing Machinery, vol. 13, No. 4, Oct. 1966, p. 471-494.
International Search Report from PCT Application No. PCT/EP2013/001668, Aug. 9, 2013.

* cited by examiner

BLOB-ENCODING

BACKGROUND

The invention relates to a method for identifying spatially extensive image features that are not pixelwise contiguous in digital images according to the claim 1.

Background of the invention is the process of inspecting a printed image in which process there is typically created a reference image in advance and this is compared with a digital image of a printed matter. By a comparison of these two images there is produced a deviation image whose pixels have assigned thereto as brightness values the difference between the respective brightness values of the respectively corresponding pixels of the reference image and of the image of the printed matter. In known methods according to the prior art the respective deviation image is a grayscale image whose pixels indicate the respective color or brightness difference between the digital image of the printed matter to be checked and the reference image. Pixels of the deviation image which have no deviations hereinafter are referred to as background pixels. Pixels whose respectively assigned deviation values exceed a specified threshold value hereinafter are referred to as foreground pixels. In the prior art the groups of contiguous foreground pixels are called features, blobs or connected components. These are spatially extensive and contiguous image features.

From the prior art there is known a plurality of algorithms for finding blobs, also called blob encoding algorithms, which ascertain information items about the relation of directly neighboring foreground pixels from specified images, in particular from the above-mentioned deviation images. In the prior art these algorithms are also referred to as blob or connected-components analysis, blob or connected-components labelling or coloring. Typical methods of this kind are described for example in Rosenfeld A. and Pfaltz J. L., "Sequential Operations in Digital Picture Processing", Journal of the ACM.—1966.—p. 471-494, Di Stefano L. and Bulgarelli A., "A simple and efficient connected components labelling algorithm", 10th International Conference on Image Analysis and Processing.—1999, He Lifeng [et al.], "Fast connected-component labelling", Pattern Recognition.—2009.—p. 1977-1987, Chang Fu and Chen Chun-Jen, "A Component-Labeling Algorithm Using Contour Tracing Technique", Proceedings of the Seventh International Conference on Document Analysis and Recognition (ICDAR'03).—[see I.]: IEEE, 2003).

From the prior art it is known to detect blobs as groups of contiguous foreground pixels. Within this meaning, two pixels are considered to be contiguous, when there is a path between them which exclusively consists of foreground pixels. As possible paths there come into consideration merely paths which extend between a pixel and its neighboring foreground pixels within four-neighborhoods or eight-neighborhoods, typically the eight-neighborhood being employed.

A four-neighborhood designates the environment of a pixel, which comprises the upper, lower, right-side and left-side neighboring pixel of the respective pixel. An eight-neighborhood designates an environment around the pixel, which comprises the upper, lower, right-side, left-side as well as all the pixels which meet with the respective pixel at a corner, i.e. the eight-neighborhood further comprises also those pixels which lie above and below the right-side as well as above and below the left-side neighboring pixel.

Any occurring collections of contiguous foreground pixels can be detected as a common, contiguous image feature with means of the prior art. Then, on the basis of the location of the individual image features in the deviation image there can be determined, whether and at most which concrete error value has occurred in the print. The reason or origin of the error cannot be automatically ascertained, which is due to the form and manifestation of the detected feature or blob, and usually requires the visual follow-up check by an expert.

It turns out, however, that accumulations of small, but mutually non-contiguous blobs that are separated by background pixels are caused by similar effects, for example by a large, smudge-like print effect, which is pronounced to different extents over its area and leads to foreground pixels only in partial regions in the deviation image, i.e. that there exist pixels which show no deviation from the reference image. Therefore, the smudge-like print effect appears as a group of a plurality of small smudges separated from each other, which are not detectable as a unit with conventional blob encoding methods. There is thus merely the possibility of detecting these individual partial smudges as such, because the conventional blob detection methods employ only direct neighborhood-relations within the meaning of a four- or eight-neighborhood. It can thus occur that each of these occurring small smudges of foreground pixels alone is not large enough so as to ultimately effect a classification as a printing error, the printing error cannot be recognized as such.

SUMMARY

In the prior art, for solving this problem there is sometimes proposed to reduce the resolution of the respective image, so that the regions imaged by the individual pixels are enlarged and the image reduced in its resolution shows contiguous faulty image features. With such a method, however, the digital image to be analyzed must necessarily be changed and deteriorated, so that a subsequent measurement of the faulty image features involves inaccuracies. Moreover, a plurality of applications requires the actually created digital image to be analyzed, in order to carry out a measurement of the faulty image features. Such methods cannot be carried out with a digital image reduced in its resolution. For this reason, the change of the digital image, in particular the reduction of the resolution of the deviation image, entails considerable disadvantages.

The object of the invention is to overcome the above-mentioned disadvantages and to recognize the faulty print effect as such.

According to the invention, in a method for identifying spatially extensive image features that are not pixelwise contiguous in a two-dimensional digital image to be examined having pixels arranged in grid from in the form of a rectangle, each pixel of the two-dimensional digital image being respectively assigned two coordinates corresponding to their positions in the rectangular grid of the digital image and the respective coordinate values of adjoining pixels respectively differing by one pixel dimension, it is provided that a) the color and/or brightness values associated with the respective pixel are checked for the presence of a specified criterion, in particular for exceeding or undershooting a specified threshold value, b) upon the presence of this criterion, an environment, surrounding the respective pixel, of a specified size and form is determined, pixels being added to the environment as environment pixels only when these environment pixels have already been checked for marked pixels in their environment, c) the environment of the respective pixel is assigned at least one environment pixel, at least one of the coordinate values of the environment pixel differing from the respective coordinate value of the pixel by at least two pixel dimensions, and d) already marked environment pixels are searched for within the environment, and upon the presence of a minimum number of marked environment pixels having the same marking within the environment, in particular of at least one marked environment pixel, the respective pixel is assigned the same marking, otherwise the respective pixel is assigned a new, not yet allocated marking, and subsequently, after the run through the pixels, those amounts of pixels which have respectively been assigned the same marking are regarded as image features.

Thus, there is the substantial advantage of the invention, that also image features that are not pixelwise contiguous and spatially extensive, as described hereinabove, can be combined. By adjusting the respective environment by individual pixels, parts of image features which are differently far apart from each other can be combined into common image features.

A special aspect of the invention provides that in the case that within the environment of the respective pixel several marked environment pixels having different markings are found, the respective markings are regarded as equivalent and the respective pixels having these markings are ascribed to the same feature. This makes it possible for individual image features, which are recognized as contiguous in the course of the identification, to be combined into common image features.

For achieving an efficient search of already marked pixels, it can be provided that the respective environment is composed of a number of partial environments defined relative to the respective pixel, if the environment pixels defined by the partial environments lie within the digital image, whereas in particular environment pixels lying outside the digital image are not ascribed to the respective partial environment.

It can be provided here that for improving the speed of finding marked pixels the individual partial environments of the respective pixel are searched for the presence of marked pixels in a specified order identical for all the pixels, or according to the same stipulation.

A particularly advantageous and computationally efficient design of the environment of a pixel provides that a) a first partial environment which has all the environment pixels whose second coordinate value corresponds to the second coordinate value of the respective pixel and whose first coordinate value is smaller than the first coordinate value of the respective pixel, but by at most the specified first environment length smaller, b) a second partial environment which has all the environment pixels whose first coordinate value is smaller than the first coordinate value of the respective pixel, but at most by a specified first environment length smaller, and whose second coordinate value is smaller than the second coordinate value of the respective pixel, but at most by the specified second environment length smaller, c) a third partial environment which has all the environment pixels whose first coordinate value corresponds to the first coordinate value of the respective pixel and whose second coordinate value is smaller than the second coordinate value of the respective pixel, but at most by a specified second environment length smaller, and d) a fourth partial environment which has all the environment pixels whose first coordinate value is greater than the first coordinate value of the respective pixel, but at most by a specified first environment length greater, and whose second coordinate value is smaller than the second coordinate value of the respective pixel, but at most by a specified second environment length smaller.

Here, for adjusting the environment to the respectively occurring image features it can be provided that the first environment length and/or second environment length each have a length of three to 20, in particular 5 to 11, pixel widths, and/or that the first environment length and second environment length are equally great.

For finding marked pixels in the region of the environment as fast as possible and with low numerical effort, it can be provided that a) first, the third partial environment is searched for the presence of marked environment pixels and if in the third partial environment a marked environment pixel is found, the marking of the marked environment pixel is adopted for the respective pixel, otherwise b) the first partial environment is searched for the presence of marked environment pixels and if in the first partial environment a marked environment pixel is found,    b1) the fourth partial environment is searched for the presence of marked environment pixels and if in the fourth partial environment a marked environment pixel is found, the marking of the marked environment pixel in the first or fourth partial environment is adopted for the respective pixel, and the markings of the marked environment pixel found in the first partial environment and of the marked environment pixel found in the fourth partial environment are regarded as equivalent,   if, however, no marked environment pixel could be found in the fourth partial environment, the marking of the marked environment pixel in the first partial environment is adopted for the respective pixel, c) if, however, no marked environment pixel is found in the first partial environment, the second partial environment is searched for the presence of marked environment pixels and if in the second partial environment a marked environment pixel is found,    c1) the fourth partial environment is searched for the presence of marked environment pixels and if in the fourth partial environment a marked environment pixel is found, the marking of the marked environment pixel in the second or fourth partial environment is adopted for the respective pixel, and the markings of the marked environment pixel found in the second partial environment and of the marked environment pixel found in the fourth partial environment are regarded as equivalent,   if, however, no marked environment pixel could be found in the fourth partial environment, the marking of the marked environment pixel in the second partial environment is adopted for the respective pixel, d) if, however, no marked environment pixel is found in the second partial environment, the fourth partial environment is searched for the presence of marked environment pixels and if in the fourth partial environment a marked environment pixel is found, the marking of the marked environment pixel in the fourth partial environment is adopted for the respective pixel, otherwise e) the respective pixel is assigned a new marking not yet allocated to other pixels.

A particularly advantageous aspect of the invention provides that a difference image between two digital images is used as digital image to be examined.

This procedure makes it possible to examine an ascertained image with a reference image for the presence of image faults and to identify these image features as image faults.

A particularly simple preprocessing step provides that the digital image has for each pixel respectively only one single brightness or color value and that upon the check of the criterion it is compared whether this brightness or color value exceeds a specified threshold value and/or whether this brightness or color value undershoots a specified further threshold value.

BRIEF DESCRIPTION OF THE DRAWINGS

A special embodiment of the invention is represented in more detail with reference to the following Figures.

FIG. 1b shows the foreground pixels of the deviation image represented in FIG. 1a.

FIG. 2 shows the order of the regular scans, with which the individual pixels of the digital image are run through.

DETAILED DESCRIPTION OF VARIOUS EMBODIMENTS

Figure 1A:
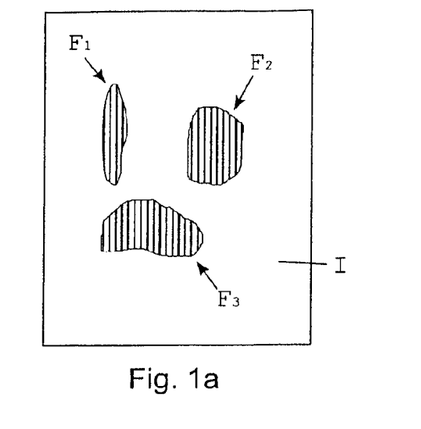
FIG. 1a shows a two-dimensional digital image to be examined, in the form of a deviation image.

The pixels P in the digital image I represented in FIG. 1a are arranged in grid form in the form of a rectangular grid, the digital image being created as the difference of a reference image and a recorded image of the same size. Each pixel P of the digital image I has respectively assigned thereto two coordinate values x, y corresponding to their position in the rectangular grid of the digital image I. The respective coordinate values x, y of adjoining pixels P differ respectively by one pixel dimension. In FIG. 1a there is represented a typical digital image I which was created as a deviation image by taking the difference between a reference image and the image of a printed matter. The digital image I is subjected to an analysis for image features F occurring in it, also referred to as blobs. In the digital image I represented in FIG. 1a there are represented altogether three image features $F_1$, $F_2$, $F_3$, which are due to printing errors.

Before, upon the image inspection, the step of blob encoding is carried out, first for each of the individual pixels P it is respectively ascertained through the formation of a threshold value, by checking a criterion for the respective pixel P, for example whether the brightness value stored in it exceeds or undershoots a specified threshold value.

If, accordingly, a deviation between the brightness value of a pixel of the reference image and the brightness value of the corresponding pixel of the image to be checked turns out to be so small that the deviation value of the digital image I does not exceed a specified threshold value, this pixel P is marked as background pixel $P_H$ or the pixel is not used as a foreground pixel $P_V$ for the further blob analysis. In this digital image I the individual foreground pixels $P_V$ are either marked in advance. Alternatively, the check and identification of the foreground pixels $P_V$ can be effected during the run represented in FIG. 2.

In FIG. 1a those pixels in which the amount of the difference of the color values of the images that were compared to each other is approximately 0 are represented in white. The greater the amount of this difference, the darker is the respective pixel P represented. In FIG. 1a there result three image features $F_1$, $F_2$, $F_3$ delimited from each other.

Figure 1B:
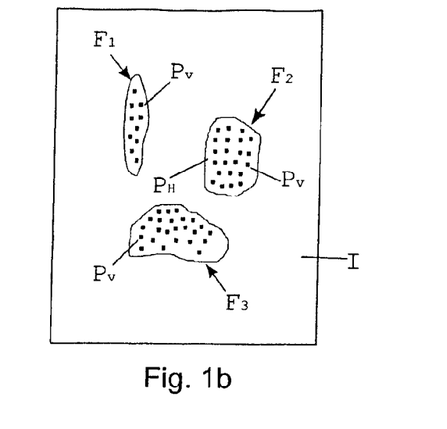

In FIG. 1b the foreground pixels $P_V$ in the digital image I are represented as black points. The foreground pixels $P_V$ in FIG. 1b are represented in black. If the respective criterion is not fulfilled, the respective pixel P is regarded as background pixel $P_H$ and represented in white. The individual image features $F_1$, $F_2$, $F_3$ which in FIG. 1a are represented contiguously, are non-contiguous in FIG. 1b. For these foreground pixels $P_V$ it cannot be readily determined whether and how these belong to common image features $F_1$, $F_2$, $F_3$.

Figure 2:
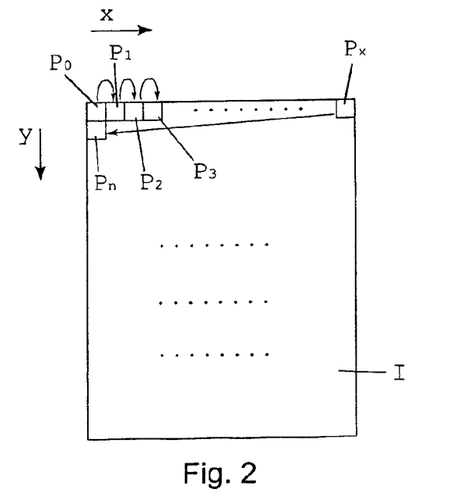

In FIG. 2 it is represented, how the individual pixels P are sequentially run through individually in the course of a regular scan. Starting out from a start pixel $P_0$ with the smallest first coordinate value x among those pixels P with the smallest second coordinate value y, there is sequentially chosen that following pixel $P_n$ whose second coordinate value y is identical and whose first coordinate value x respectively takes the next higher value. In the present case, one first reaches, starting out from start pixel $P_0$, a first pixel $P_1$, then a second pixel $P_2$ etc., until one finally reaches that pixel $P_x$ for which no pixel is available that has an identical second coordinate value y and that has a higher first coordinate value x. In this case, that following pixel $P_n$ is chosen which has the smallest first coordinate value x among those pixels P which have the respective next-larger second coordinate value y. This process is continued until ultimately all the pixels P of the digital image I were run through.

Figure 3:
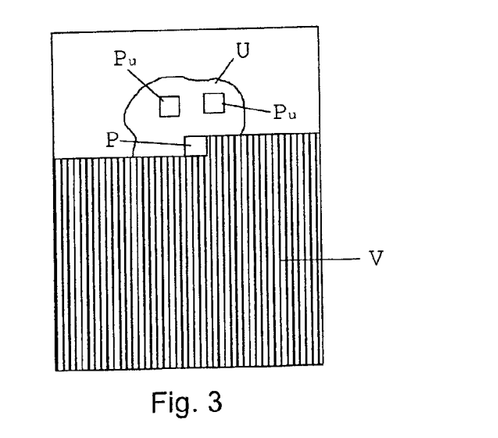
FIG. 3 shows the procedure in the concrete embodiment according to the invention for recognizing marked pixels within a neighborhood.

In FIG. 3 there is represented in more detail the concrete procedure for the detection of image features F that are not pixelwise contiguous. The target of the procedure is to provide all the foreground pixels $P_V$ with a marking that is associated with that image feature to which the respective foreground pixels $P_V$ belong. As soon as in the course of the regular scan represented in FIG. 2 a foreground pixel $P_V$ is encountered, this foreground pixel $P_V$ is regarded as belonging to an image feature $F_1$, $F_2$, $F_3$. It is examined whether in its environment U there are already located foreground pixels $P_V$ which have already obtained a marking. If this is not the case, with the respective pixel there is associated a marking which differs from all the markings which have already been allocated.

The environment U is chosen such that there are associated with it, from all the possible pixels P, in any case only those pixels P which have already been examined for marked environment pixels $P_U$ in their environment U. Thus, due to the regular scan or due to the order in which the individual pixels P are sequentially processed, those pixels P which are located in the region V on the right side of or in a row below the respective pixel P are ruled out as environment pixels $P_U$. Such pixels are not associated with the environment U of the respective pixel P and are excluded therefrom.

If the respectively run-through pixel P is a foreground pixel $P_V$, already marked environment pixels $P_U$ are searched for within the environment U, upon the presence of a minimum number of marked environment pixels $P_U$ having the same marking within the environment U the respective pixel being assigned the same marking. In the present embodiment it is sufficient when at least one marked environment pixel $P_U$ already provided with a marking is found within the environment U. The respective pixel P is assigned this marking. If within the environment U not a single environment pixel $P_U$ which has already been assigned a marking can be found, the respective pixel is assigned a new, not yet allocated marking.

If the presently run-through pixel P is a background pixel $P_H$, no marking is allocated and the next pixel is checked.

In the present case, for the recognition of image features F that are not pixelwise contiguous the environment U of the respective pixel P is chosen in any case such that the environment U contains at least one environment pixel $P_U$ which differs in at least one of its coordinate values x, y by at least two pixel dimensions from the respective coordinate value x, y of the pixel P. The environment U of the respective pixel P is thus not only assigned its direct neighbor-pixels within the meaning of a four or eight-neighborhood (FIG. 3a), but the environment U of the respective pixel P is chosen larger.

Figure 3A:
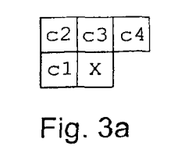
FIG. 3a shows a pixel with an environment of four bordering pixels.
Figure 3B:
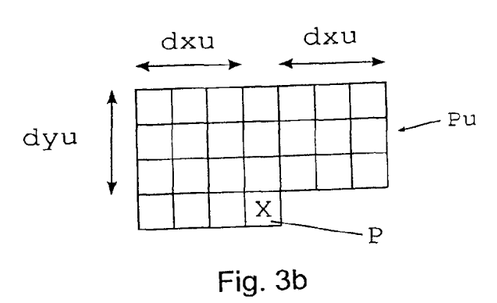
FIG. 3b shows a pixel with an environment of twenty-four pixels.
Figure 3C:
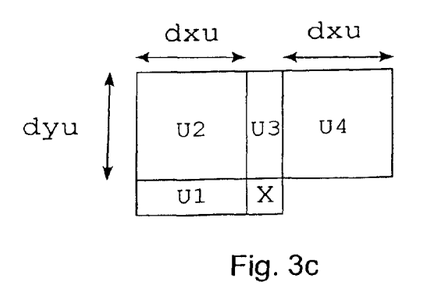
FIG. 3c shows the environment represented in FIG. 3b subdivided into four partial environments.

In the present embodiment, an environment U as represented in FIG. 3b was chosen. The environment U of the respective pixel P in FIG. 3b comprises all the already examined or run-through pixels P whose first and second coordinate values x, y differ from the respective coordinate values x, y of the pixel P respectively by at most 3 pixel dimensions. For a more efficient check for marked pixels P within the environment U, the environment U as represented in FIG. 3c is subdivided into four partial environments $U_1$, $U_2$, $U_3$, $U_4$.

In so doing, the form of the environment U is defined for all the pixels P respectively identical, the respective environment U is equally composed of a number of environment pixels $P_U$ defined relative to the respective pixel P. One single exception thereof arises for pixels P which lie at the edge of the digital image I or whose environment U respectively reaches into the edge of the digital image I, with individual environment pixels $P_U$ of the respective pixel P lying outside the digital image I. For pixels P which are located sufficiently far within the digital image I, the respective environment U is respectively created according to the same geometric criteria; the environment U of such pixels has the same form and size. In the present embodiment, the environment U of the pixels P comprises four partial environments $U_1$, $U_2$, $U_3$, $U_4$, which are respectively created for the pixels P that are located sufficiently far in the interior of the digital image I, taking respectively the same criteria as a basis. Here, respectively two environment lengths dxu, dyu are specified, which define the size of the respective environment U of the pixel P. In the present embodiment, the two environment lengths dxu, dyu are equally great and respectively have the value of three pixel widths.

The first partial environment $U_1$ has all the environment pixels $P_U$ whose second coordinate value y corresponds to the second coordinate value y of the respective pixel P and whose first coordinate value x is smaller than the first coordinate value x of the respective pixel P, but at most by the specified first environment length dxu smaller. The second partial environment $U_2$ of the environment U has all the environment pixels $P_U$ whose first coordinate value x is smaller than the first coordinate value x of the respective pixel P, but at most by a specified first coordinate length dxu smaller, and whose second coordinate value y is smaller than the second coordinate value y of the respective pixel P, but at most by the specified second environment length dyu smaller. Further, the environment U of the pixel P has a third partial environment $U_3$ which has all the environment pixels $P_U$ whose first coordinate value x corresponds to the first coordinate value x of the respective pixel P and whose second coordinate value y is smaller than the second coordinate value y of the respective pixel P, but at most by the second environment length dyu smaller. Further, the environment U has a fourth partial environment $U_4$, which has all the environment pixels $P_U$ whose first coordinate value x is greater than the first coordinate value x of the respective pixel P, but at most by a specified first environment length dxu greater, and whose second coordinate value y is smaller than the second coordinate value y of the respective pixel P, but at most by a specified second environment length dyu smaller.

Figure 4:
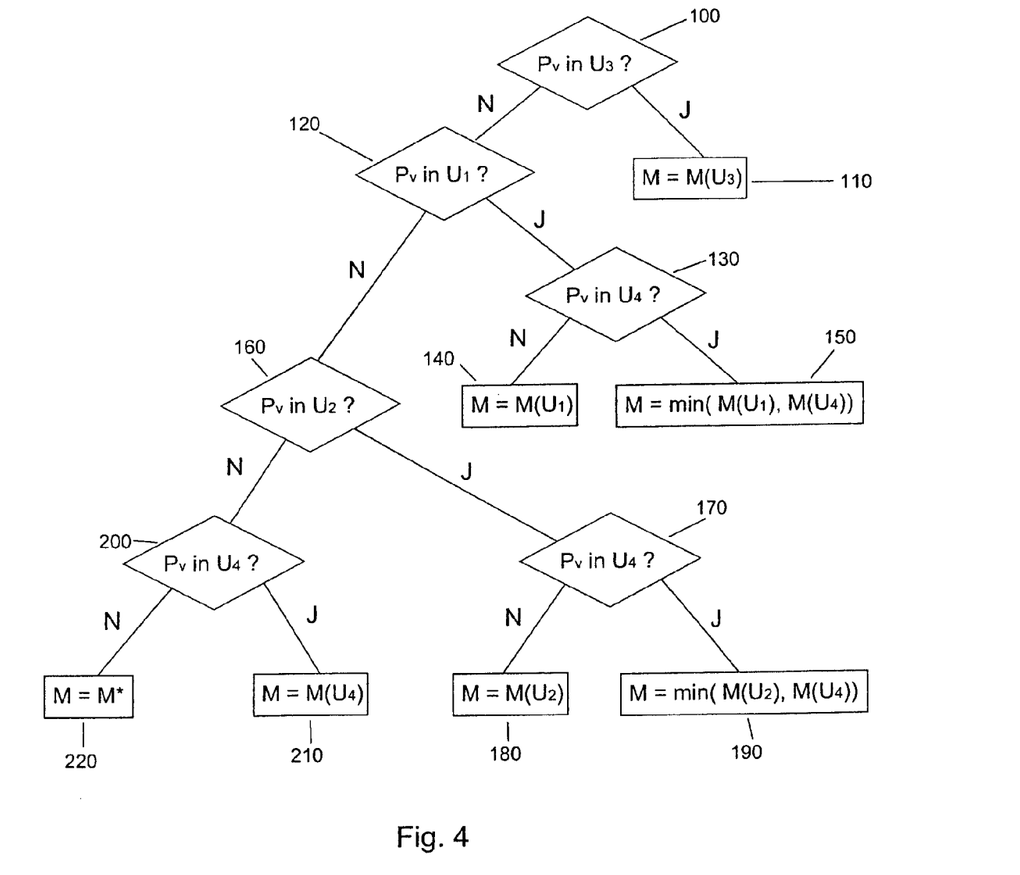
FIG. 4 shows a preferred procedure upon searching the environment of a pixel.

In the present embodiment, the environment U comprises altogether 24 pixels in four partial environments $U_1$, $U_2$, $U_3$, $U_4$. The individual partial environments $U_1 \ldots, U_4$ of the respective pixel P are searched for the presence of marked pixels, for all the pixels in the same order and according to the same stipulation. In so doing, different neighborhood analysis methods from the literature for environments U as represented in FIG. 3a are used. It is a target of such optimization strategies to check only as many points as absolutely necessary for ascertaining a marking that is correct for the respective pixel P. In FIG. 4 there is represented a concrete further development of the algorithms according to He He Lifeng [et al.], "Fast connected-component labelling", Pattern Recognition.—2009.—p. 1977-1987, which is based on an environment definition represented in FIG. 3a. Instead of the individual pixels $C_1$, $C_2$, $C_3$, $C_4$ to be examined in FIG. 3a, respectively the partial environments $U_1$, $U_2$, $U_3$, $U_4$ are examined for the presence of markings.

This adjusted algorithm is represented in the form of a decision tree in FIG. 4. In the respective nodes represented in the decision tree of FIG. 4 it is examined whether a foreground pixel can be found within the specified partial environment (step 100). If a foreground pixel $P_V$ is contained in the third partial environment $U_3$, the pixel is provided with the marking with which the foreground pixel $P_V$ contained in the third partial environment $U_3$ is provided (step 110). If in the third partial environment $U_3$ of the pixel P no foreground pixel $P_V$ could be found, then foreground pixels $P_V$ are searched for in the first partial environment $U_1$ (step 120). If within the first partial environment $U_1$ there can be found a marked foreground pixel $P_V$, it is thereafter examined (step 130) whether there is a foreground pixel $P_V$ also within the fourth partial environment $U_4$. If this is not the case, the respective pixel is assigned the marking of that foreground pixel $P_V$ which was found in the first partial environment $U_1$ (step 140). If, however, in both the first partial environment $U_1$ and the fourth partial environment $U_4$ there can be respectively found a foreground pixel $P_V$, the respective pixel is assigned the numerically respectively smaller marking, that is, that in the case that the marking of the foreground pixel $P_V$ located in the first partial environment $U_1$ is smaller than the marking of the foreground pixel $P_V$ located in the fourth partial environment $U_4$, the respective pixel is assigned the marking of the pixel located in the first partial environment $U_1$, otherwise this pixel is assigned the marking of the foreground pixel $P_V$ located in the fourth partial environment (step 150).

If neither in the third partial environment $U_3$ nor in the first partial environment $U_1$ a foreground pixel $P_V$ can be found, it is checked whether a foreground pixel (step 160) is present in the second partial environment $U_2$. If this is the case, it is thereafter also checked, whether a foreground pixel can be found in the fourth partial environment $U_4$ (step 170). If this is not the case, the respective pixel is assigned the marking of that foreground pixel $P_V$ which was found in the second partial environment $U_2$ (step 180). If, however, in both the second partial environment $U_2$ and the fourth partial environment $U_4$ there can be respectively found a foreground pixel, the respective pixel is assigned the numerically respectively smaller marking, that is, that in the case that the marking of the foreground pixel $P_V$ located in the second partial environment $U_2$ is smaller than the marking of the foreground pixel $P_V$ located in the fourth partial environment $U_4$, the respective pixel is assigned the marking of the pixel located in the second partial environment $U_2$, otherwise this pixel is assigned the marking of the foreground pixel located in the fourth partial environment (step 190).

If upon the check for foreground pixels $P_V$ present within the partial environment $U_2$ in the step 160 no foreground pixels $P_V$ can be found, it is thereafter checked, whether foreground pixels $P_V$ are present within the fourth partial environment $U_4$ (step 200). If this is the case, the respective pixel is assigned the marking of the foreground pixel $P_V$ which was found in the partial environment $U_4$ (step 210). If, however, also in the fourth partial environment $U_4$ no foreground pixel $P_V$ can be found, it is to be assumed that the pixel to be examined does not belong to any hitherto known feature and therefore is to be provided with a new, not yet allocated marking. For this purpose there are typically chosen markings which start with a finite number, as the smallest number there can be employed for example the number 1. If, as represented in the step 220, no already marked foreground pixels $P_V$ can be found within the environment of the respective pixel, the respective pixel is respectively associated with a marking which is by 1 higher than the hitherto allocated highest marking.

If in the steps 150 or 190 within the environment there are found two foreground pixels $P_V$ respectively having different markings, the markings are considered respectively equivalent to each other. All the pixels that have associated therewith mutually equivalent markings are regarded as pixels of one and the same image feature F.

The invention claimed is:
1. A method for identifying spatially extensive image features that are not pixelwise contiguous in a two-dimensional digital image to be examined having pixels arranged in grid form in the form of a rectangular grid, wherein each pixel of the two-dimensional digital image is respectively assigned two coordinate values corresponding to their position in the rectangular grid of the digital image, and the respective coordinate values of adjoining pixels respectively differ by one pixel dimension;
   wherein the individual pixels are run through in the order of a regular scan;
   wherein for each of the thus run-through pixels the following method steps a) to d) are performed, namely that:
   a) the color and/or brightness values associated with the respective pixel are checked for the presence of a specified criterion for exceeding or undershooting a specified threshold value;
   b) upon the presence of this criterion, an environment, surrounding the respective pixel, of a specified size and form is determined, wherein pixels are added to the environment as environment pixels only when these environment pixels have already been checked for marked pixels in their environment;
   c) the environment of the respective pixel is assigned at least one environment pixel, wherein at least one of the coordinate values of the environment pixel differs from the respective coordinate value of the pixel by at least two pixel dimensions; and
   d) already marked environment pixels are searched for within the environment, and upon the presence of a minimum number of marked environment pixels having the same marking within the environment of at least one marked environment pixel, the respective pixel is assigned the same marking, otherwise the respective pixel is assigned a new, not yet allocated marking; and
   subsequently, after the run through the pixels, those amounts of pixels which have respectively been assigned the same marking are regarded as image features.

2. The method according to claim 1, wherein in the case that within the environment of the respective pixel several marked environment pixels having different markings are found, the respective markings are regarded as equivalent to each other and the respective pixels having these markings are ascribed to the same feature.

3. The method according to claim 1, wherein the respective environment is composed of a number of partial environments defined relative to the respective pixel, if the environment pixels defined by the partial environments lie within the digital image, wherein environment pixels lying outside the digital image are not ascribed to the respective partial environment.

4. The method according to claim 3, wherein the individual partial environments of the respective pixel are searched for the presence of marked pixels in a specified order identical for all the pixels, or according to the same stipulation.

5. The method according to claim 3, wherein the environment of a pixel respectively has the following partial environments, which are defined, taking as a basis two specified environment lengths, as follows:
   a) a first partial environment which has all the environment pixels whose second coordinate value corresponds to the second coordinate value of the respective pixel and whose first coordinate value is smaller than the first coordinate value of the respective pixel, but at most by the specified first environment length smaller;
   b) a second partial environment which has all the environment pixels whose first coordinate value is smaller than the first coordinate value of the respective pixel, but at most by a specified first environment length smaller, and whose second coordinate value is smaller than the second coordinate value of the respective pixel, but at most by the specified second environment length smaller;
   c) a third partial environment which has all the environment pixels whose first coordinate value corresponds to the first coordinate value of the respective pixel and whose second coordinate value is smaller than the second coordinate value of the respective pixel, but at most by a specified second environment length smaller; and
   d) a fourth partial environment which has all the environment pixels whose first coordinate value is greater than the first coordinate value of the respective pixel, but at most by a specified first environment length greater, and whose second coordinate value is smaller than the second coordinate value of the respective pixel, but at most by a specified second environment length smaller.

6. The method according to claim 3, wherein the first environment length and/or second environment length respectively have a length of three to 20, and/or that the first environment length and second environment length are equally great.

7. The method according to claim 3, wherein the individual partial environments are examined for the presence of already marked pixels in the following order, wherein:
a) first, the third partial environment is searched for the presence of marked environment pixels and if in the third partial environment a marked environment pixel is found, the marking of the marked environment pixel is adopted for the respective pixel, otherwise;
b) the first partial environment is searched for the presence of marked environment pixels and if in the first partial environment a marked environment pixel is found;
  b1) the fourth partial environment is searched for the presence of marked environment pixels and if in the fourth partial environment a marked environment pixel is found, the marking of the marked environment pixel in the first or fourth partial environment is adopted for the respective pixel and the markings of the marked environment pixel found in the first partial environment and of the marked environment pixel found in the fourth partial environment are regarded as equivalent;
  if, however, no marked environment pixel could be found in the fourth partial environment, the marking of the marked environment pixel in the first partial environment is adopted for the respective pixel;
c) if, however, no marked environment pixel is found in the first partial environment, the second partial environment is searched for the presence of marked environment pixels and if in the second partial environment a marked environment pixel is found;
  c1) the fourth partial environment is searched for the presence of marked environment pixels and if in the fourth partial environment a marked environment pixel is found, the marking of the marked environment pixel in the second or fourth partial environment is adopted for the respective pixel and the markings of the marked environment pixel found in the second partial environment and of the marked environment pixel found in the fourth partial environment are regarded as equivalent;
  if, however, no marked environment pixel could be found in the fourth partial environment, the marking of the marked environment pixel in the second partial environment is adopted for the respective pixel;
d) if, however, no marked environment pixel is found in the second partial environment, the fourth partial environment is searched for the presence of marked environment pixels and if in the fourth partial environment a marked environment pixel is found, the marking of the marked environment pixel in the fourth partial environment is adopted for the respective pixel, otherwise;
e) the respective pixel is assigned a new marking not yet allocated to other pixels.

8. The method according to claim 1, wherein a difference image between two digital images is used as digital image to be examined.

9. The method according to claim 1, wherein the digital image has for each pixel respectively only one single brightness or color value and that upon the check of the criterion it is compared whether this brightness or color value exceeds a specified threshold value and/or whether this brightness or color value undershoots a specified further threshold value.

10. A non-transitory computer-readable medium device having instructions stored thereon, which, when implemented on a computer comprising one or more processing units, cause the one or more processing units to perform a method for identifying spatially extensive image features that are not pixelwise contiguous in a two-dimensional digital image to be examined having pixels arranged in grid form in the form of a rectangular grid, wherein each pixel of the two-dimensional digital image is respectively assigned two coordinate values corresponding to their position in the rectangular grid of the digital image, and the respective coordinate values of adjoining pixels respectively differ by one pixel dimension;
  wherein the individual pixels (P) are run through in the order of a regular scan;
  wherein for each of the thus run-through pixels the following method steps a) to d) are performed:
  a) the color and/or brightness values associated with the respective pixel are checked for the presence of a specified criterion, in particular for exceeding or undershooting a specified threshold value;
  b) upon the presence of this criterion, an environment, surrounding the respective pixel, of a specified size and form is determined, wherein pixels are added to the environment as environment pixels only when these environment pixels have already been checked for marked pixels in their environment;
  c) the environment of the respective pixel is assigned at least one environment pixel, wherein at least one of the coordinate values of the environment pixel differs from the respective coordinate value of the pixel by at least two pixel dimensions; and
  d) already marked environment pixels are searched for within the environment, and upon the presence of a minimum number of marked environment pixels having the same marking within the environment of at least one marked environment pixel, the respective pixel is assigned the same marking, otherwise the respective pixel is assigned a new, not yet allocated marking; and
  subsequently, after the run through the pixels, those amounts of pixels which have respectively been assigned the same marking are regarded as image features.

* * * * *